Patented Dec. 11, 1945

2,390,942

UNITED STATES PATENT OFFICE 2,390,942

ETHERS OF ALCOHOL AMINES

Morris Katzman and Albert K. Epstein, Chicago, Ill., assignors to The Emulsol Corporation, Chicago, Ill.

No Drawing. Application October 13, 1941, Serial No. 414,776

9 Claims. (Cl. 260—404)

This invention relates to new chemical compounds which have particular utility in the arts where interface modifying functions are required.

One of the objects of the invention is the preparation of new chemical compounds having unusual resistance to decomposition in acid and alkali media.

Another object of the invention resides in the preparation of new chemical compounds which are particularly useful in enhancing the emulsification of oleaginous and aqueous materials.

Other objects and features of the invention will become more apparent as the description proceeds.

In general, the compounds of the present invention may be characterized as ethers of alcohol amines in which the radical which unites with the alcohol amine or derivative thereof to produce the ether is an aliphatic polyhydroxy substance in which at least one hydrogen of an hydroxy group is replaced by an organic radical containing at least eight carbon atoms and particularly from twelve to eighteen carbon atoms. In the preferred embodiments of the invention, the final ether compounds contain at least one free or unesterified hydroxyl group which is attached to the alcohol amine radical. The especially preferred compounds of the present invention are those which are derived from alcohol tertiary amines in which at least one of the hydroxy groups of the alcohol amine remains in free or unesterified form.

The ethers of the present invention may be prepared in various ways. A particularly satisfactory method of preparation involves the conversion of the alcohol amine into an alcoholate, for example, an alkali metal alcoholate, and then said alcoholate is reacted with a halide derivative of the aliphatic polyhydroxy substance. The reaction results in the production of an alkali metal halogen salt which may be separated from the reaction mixture in any desired manner.

The following example is illustrative of methods which may be employed for preparing the novel ether compounds of the present invention. As previously indicated, other methods may be used, the proportions of reacting ingredients, the times of reaction, the order of steps, and the temperatures may be varied and supplementary processes of purification and the like may be resorted to wherever found desirable or convenient. These and other variations and modifications will be evident to those skilled in the art in the light of the guiding principles which are disclosed herein.

Example 70 grams of commercial triethanolamine, 10 grams of metallic sodium in thin slices, and 100 grams of a product consisting essentially of the mono chloracetic acid mono ester of coconut oil fatty acid mono esters of diethylene glycol were mixed together and allowed to stand at room temperature for one hour. 100 cc. of dry dioxane were then added and the mass was heated to refluxing temperature and allowed to reflux for at least two hours. It was then cooled and an excess of ether added thereto and the insoluble matter was then filtered off. The ether and dioxane were then evaporated under vacuum and the resulting product, which was a clear amber oil and had good foaming properties, particularly in slightly acid media, contained a substantial proportion of a compound having the formula

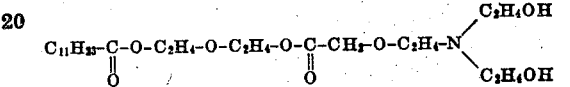

Other examples of products which fall within the scope of the present invention and which may be prepared by methods generally similar to those described hereinabove are listed below:

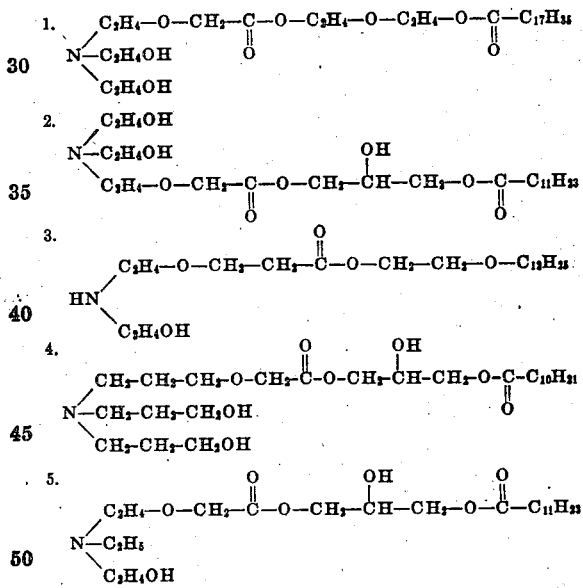

While the above examples represent single substances, it will be understood that, in practice, it may be, in general, more advantageous to employ mixtures of any two or more thereof with or without diluents. Indeed, where commercial sources of ingredients are utilized, mixtures of various compounds falling within the scope of the present invention will be produced.

The alcohol amines from which the ethers of the present invention are prepared may be selected from a large class and include particularly the alcohol tertiary amines and alkylolamines, symmetrical and unsymmetrical, normal and iso derivatives. Among the compounds, mixtures of any two or more of which may be employed, are, for example, monoethanolamine, diethanolamine, triethanolamine and mixtures thereof such as occur in the so-called commercial triethanolamine, monoethyl diethanolamine, monopropanolamine, dipropanolamine, tripropanolamine, tri-isopropanolamine, dibutanolamine, tributanolamine, dipentanolamine, trihexanolamine, N-cyclohexyl dibutanolamine, diethanol aniline, monoethyl dipropanolamine, diethanol cyclohexylamine, monobutyl diethanolamine, diethanol methylamine, alkylol primary, secondary and tertiary amines of other mono- or polyvalent alcohols such as glycols, glycerol, sugars and sugar alcohols, such as sorbitol; alkylol polyamines, such as alkylol derivatives of ethylene diamine, diethylene triamine and triethylene tetra-amine; arylol amines such as N-phenyl diethanolamine and alkylolamines such as, for example, $$N \equiv (CH_2-O-CH_2-CH_2OH)_3$$
$$N \equiv (CH_2-CH_2-O-CH_2-CH_2OH)_3$$
$$N \equiv (CH_2-CHOH-CH_2OH)_3$$

Because of commercial and other considerations, it is preferred to employ the tertiary alkylolamines, particularly, triethanolamine and tri-isopropanolamine.

The derivatives of the aliphatic polyhydroxy substances, the ethers with the alcohol amines of which comprise the novel compounds of the present invention, are obtainable by substituting alkyl (including cycloalkyl) or acyl radicals, of high molecular weight, in place of the hydrogen of one or more hydroxy groups of aliphatic polyhydroxy substances or polyhydric alcohols, it being understood that at least one hydroxy group attached to the nucleus of the polyhydroxy substance or polyhydric alcohol remains. As examples of such derivatives may be mentioned partially esterified or partially etherified mono-, di-, and poly-saccharides, and sugar alcohols such as monolauric acid ester of sucrose, monostearic acid ester of dextrose, monopalmitic acid ester of sorbitol, monolauryl ether of pentaerythritol, monolauric acid ester of pentaerythritol, and the like; the monoglycerides and di-glycerides, preferably of the higher fatty acids, including, for example, mono-laurin, monomyristin, monostearin, monoolein, distearin, diolein, dicaproin; mono-lauryl ether of glycerol, mono-oleyl ether of glycerol, mono-cetyl ether of glycerol, di-cetyl ether of glycerol, mono-stearyl ether of glycerol, monostearic acid ester of diethylene glycol, monolauric acid ester of ethylene glycol, and the like. The aliphatic polyhydroxy substance which is partially esterified or etherified to provide one of the reacting constituents herein may be selected from a large class and includes, among those mentioned, glycerol; glycols such as ethylene glycol, propylene glycol, trimethylene glycol, butylene glycol and the like; polyglycols such as diethylene glycol; pentaerythritol; quercitol; dihydroxy acetone; polyglycerols such as diglycerol, triglycerol, tetraglycerol and the like including mixtures thereof; carbohydrates and sugars including mono, di- and polysaccharides, such as dextrose, sucrose, xylose, arabinose, galactose, fructose, maltose, mannose, dextrin, starch, and the like; the natural and synthetic, simple and complex glucosides; sugar alcohols such as arabitol, mannitol, sorbitol and dulcitol; and polyhydroxy-carboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, ethers of similar character, and hydroxyethyl and hydroxypropyl ether derivatives of the above, as, for example:

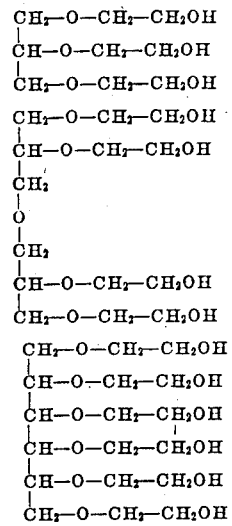

(For convenience, all hydroxyl groups are written facing one way.) In general, this type of substance may be represented by the formula $$(RO)_v-A-(OH)_w$$

wherein R is a radical containing at least eight carbon atoms and selected from the group consisting of alkyl, cyclo-alkyl, aryl, aralkyl, and acyl, and substitution products thereof, A is the residue of the aliphatic polyhydroxy substance, and $v$ and $w$ are small whole numbers.

The aforesaid substances may be converted into halides, such as chlorine, bromine and iodine derivatives, and reacted with alkali metal alcoholates of the alcohol amines. Or, alternatively, the aforesaid substances may be converted into alkali metal alcoholates and reacted with a halogen derivative of the alcohol amine.

The compounds of the present invention have utility in various arts in which interface modifying agents are employed. They are particularly resistant to precipitation by calcium and magnesium salts and are especially compatible with acid and alkali media. They may be utilized in washing, laundering and mercerizing baths in the textile and related industries wherein they function for softening, wetting, lathering, detergent, emulsifying, penetrating, dispersing, frothing and foaming purposes. The textiles, various treatments of which in the presence of the agents of the present invention is rendered effective, comprise natural products such as cotton, wool, linen and the like as well as the artificially produced fibres (and fabrics), such as rayon, cellulose acetates, cellulose ethers and similar artificial silk fabrics. It will be understood, of course, that the agents may be used in aqueous and other media either alone or in combination with other suitable salts of organic or inorganic character or with other interface modifying agents. In the dyeing of textiles many of them may be employed as assistants in order to bring about even level shades. Many of them also may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agricultural purposes. They have utility in the preparation of hair washes and hair shampoos, dentifrices of liquid, cream and powder type, cosmetic creams such as cold creams, vanishing creams, tissue creams, shaving creams of the brushless and lathering type and similar cosmetic preparations. Another use to which many of the agents may be placed is for the treatment of paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess utility in the ore dressing industry wherein they function effectively in froth flotation and agglomeration processes. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water-in-oil type which are encountered in oil-field operations, and for various other purposes which will readily occur to those versed in the art in the light of the disclosure herein.

As detergents, they may in general be dissolved in water or aqueous media and utilized in that form or, in the case of solid products, they may be packaged and sold in such form preferably mixed with diluents. They may also be utilized for commercial cleansing, laundering and washing operations with advantage.

The products of the present invention may be employed alone or together with lesser or greater quantities of inorganic or organic compounds. Thus, for example, many of them may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl monoethanolamine sulpho-acetate, and the like; sulphuric and sulphonic derivatives of condensation products of alkylolamines and higher fatty acids; Turkey-red oils; compounds of the type of isopropyl naphthalene sodium sulphonate, and other classes of wetting agents.

Many of the novel compounds of the present invention can be represented by the general formula

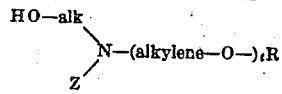

wherein R is the radical of an aliphatic polyhydroxy substance partially esterified or etherified with a higher molecular weight group, Z is hydrogen, alkyl, cycloalkyl, aryl, aralkyl, HO—alk or (alk—O—)$_t$R, and $t$ is a whole number, preferably 1 or 2. Of particular utility are those compounds where alkylene is ethylene, propylene or butylene, R is an aliphatic polyhydric alcohol partially esterified with a fatty acid containing from 12 to 18 carbon atoms, $t$ is one, and Z hydrogen, HO—alk, or (alkylene—O—)$_t$R.

Others of the compounds of the present invention may be represented by the general formula

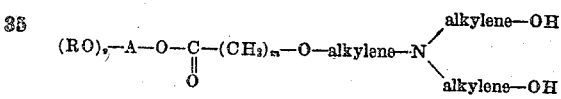

wherein R is a member selected from the group consisting of alkyl and acyl radicals containing at least eight carbon atoms, A is the residue of an aliphatic polyhydroxy substance, and $v$ and $m$ are small whole numbers. Preferably, $v$ is 1 or 2 and $m$ is from 1 to 4.

This application is a continuation-in-part of our prior application, Serial No. 265,783, filed April 3, 1939, now Patent No. 2,290,880, issued July 28, 1942.

What we claim as new and desire to protect by Letters Patent of the United States is:

1. An ether compound in the form of an aliphatic polyhydric alcohol one hydroxy group of which is esterified with a fatty acid containing from 8 to 18 carbon atoms and at least one hydroxy group of which is esterified with an aliphatic carboxylic acid containing up to 5 carbon atoms, one hydrogen of said aliphatic carboxylic acid radical being replaced by the radical of an alkylol amine, the linkage between said alkylol amine radical and the remaining portion of the molecule of the final compound being an ether linkage.

2. An ether compound in the form of an aliphatic polyhydric alcohol one hydroxy group of which is esterified with a fatty acid containing from 8 to 18 carbon atoms and at least one hydroxy group of which is esterified with an aliphatic carboxylic acid containing up to 5 carbon atoms, one hydrogen of said aliphatic carboxylic acid radical being replaced by the radical of an alkylol tertiary amine, the linkage between said alkylol tertiary amine radical and the remaining portion of the molecule of the final compound being an ether linkage, the final compound containing at least one free hydroxy group in the alkylol tertiary amine radical.

3. An ether compound in the form of an aliphatic polyhydric alcohol at least one hydroxy group of which is esterified with a carboxylic acid containing at least 8 carbon atoms and at least one hydroxy group of which is esterified with acetic acid, one hydrogen of the acetic acid radical being replaced by the radical

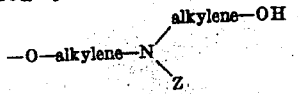

Z being selected from the group consisting of hydrogen, alkyl and alkylol.

4. An ether compound in the form of an aliphatic polyhydric alcohol at least one hydroxy group of which is esterified with a fatty acid containing from 8 to 18 carbon atoms and at least one hydroxy group of which is esterified with an aliphatic carboxylic acid containing up to 5 carbon atoms, one hydrogen of said aliphatic carboxylic acid radical being replaced by the radical

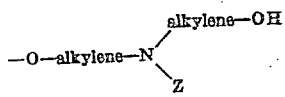

Z being selected from the group consisting of hydrogen, alkyl and alkylol.

5. An ether compound in the form of a glycol one hydroxy group of which is esterified with a fatty acid containing at least 8 carbon atoms and the other hydroxy group of which is esterified with acetic acid, one hydrogen of the acetic acid radical being replaced by the tertiary amine radical

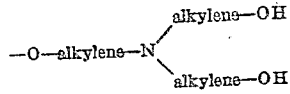

6. An ether compound corresponding to the formula

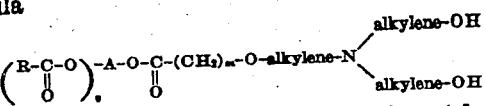

wherein R is an alkyl radical containing at least 7 carbon atoms, A is an aliphatic polyhydric alcohol radical, and $v$ and $m$ are small whole numbers.

7. An ether compound corresponding to the formula

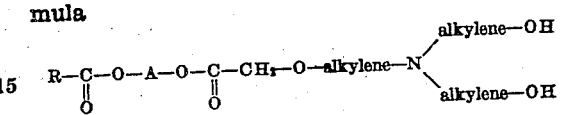

wherein R is a straight chain alkyl radical containing from 7 to 17 carbon atoms, and A is a member selected from the group consisting of glycerol and glycol radicals.

8. An ether compound corresponding to the formula

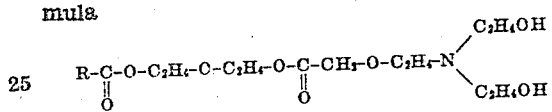

where R is an alkyl radical containing at least 7 carbon atoms.

9. An ether compound corresponding to the formula

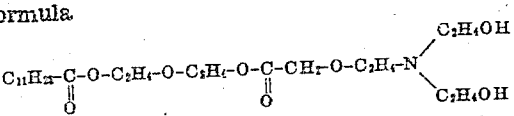

MORRIS KATZMAN.
ALBERT K. EPSTEIN.